US008503023B2

(12) United States Patent
Nishide (10) Patent No.: US 8,503,023 B2
(45) Date of Patent: Aug. 6, 2013

(54) IMAGE PROCESSING APPARATUS, IMAGE PROCESSING METHOD AND COMPUTER-READABLE MEDIUM

(75) Inventor: Yasushi Nishide, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 588 days.

(21) Appl. No.: 12/714,847

(22) Filed: Mar. 1, 2010

(65) Prior Publication Data

US 2011/0043835 A1    Feb. 24, 2011

(30) Foreign Application Priority Data

Aug. 20, 2009 (JP) ................................. 2009-191151

(51) Int. Cl.
*H04N 1/40* (2006.01)

(52) U.S. Cl.
USPC ............................ 358/1.18; 358/2.1; 358/500

(58) Field of Classification Search
USPC .................... 358/1.9, 2.1, 1.18, 1.4, 1.6, 500, 358/400, 468, 517, 527, 529, 450, 538, 443
See application file for complete search history.

(56) References Cited

U.S. PATENT DOCUMENTS

2005/0212907 A1    9/2005  Teraue
2007/0121131 A1    5/2007  Hauser

FOREIGN PATENT DOCUMENTS

JP    2006-203620 A    8/2006
JP    2008-28917 A     2/2008

OTHER PUBLICATIONS

Search Report dated Jun. 28, 2011 from the European Patent Office in counterpart European application No. 10155160.4.
"Chapter 4" In: Adobe Systems Incorporated: "Postscript Language Reference Third Edition", 1999, Addison-Wesley, XP002639735, ISBN: 0-201-37922-8, pp. 175-311.
Office Action dated Feb. 19, 2013, issued by the Japanese Patent Office in Japanese Patent Application No. 2009-191151.

*Primary Examiner* — Thomas D Lee
*Assistant Examiner* — Stephen M Brinich
(74) *Attorney, Agent, or Firm* — Sughrue Mion, PLLC

(57) ABSTRACT

An image processing apparatus includes a spot color area detection unit, an erasing determination unit and a drawing control unit. The spot color area detection unit detects a spot color area in image information. The erasing determination unit determines, based on designation regarding drawing of the spot color area, as to whether or not a non-spot color area overlapping the spot color area is to be erased. The drawing control unit outputs an instruction of erasing the spot color area and determines a drawing range of the non-spot color area based on a determination result of the erasing determination unit.

20 Claims, 6 Drawing Sheets

IMAGE PROCESSING APPARATUS, IMAGE PROCESSING METHOD AND COMPUTER-READABLE MEDIUM

CROSS-REFERENCE TO RELATED APPLICATIONS

This application is based on and claims priority under 35 USC 119 from Japanese Patent Application No. 2009-191151 filed Aug. 20, 2009.

BACKGROUND

1. Technical Field

The present invention relates to an image processing apparatus, an image processing method and a computer-readable medium.

2. Related Art

A proofreading output image can be easily produced using a color printer in advance so as to confirm a state of a digital document that is to be finally printed by a printing machine. In this case, if a spot color is contained in the digital document, the spot color is approximated by process colors (e.g., cyan (C), magenta (M), yellow (Y), black (K)) and output. However, if a user designates a spot color unintentionally, for example, an erroneous spot color designation may be overlooked in the proofreading output image, because the spot color part is also printed with the process colors by the color printer.

SUMMARY

According to one aspect of the invention, an image processing apparatus includes a spot color area detection unit, an erasing determination unit and a drawing control unit. The spot color area detection unit detects a spot color area in image information. The erasing determination unit determines, based on designation regarding drawing of the spot color area, as to whether or not a non-spot color area overlapping the spot color area is to be erased. The drawing control unit outputs an instruction of erasing the spot color area and determines a drawing range of the non-spot color area based on a determination result of the erasing determination unit.

BRIEF DESCRIPTION OF THE DRAWINGS

Exemplary embodiments of the invention will be described in detail below based on the accompanying drawings, in which.

DETAILED DESCRIPTION

Exemplary embodiments of the present invention will be described below with reference to the drawings.

Figure 1:
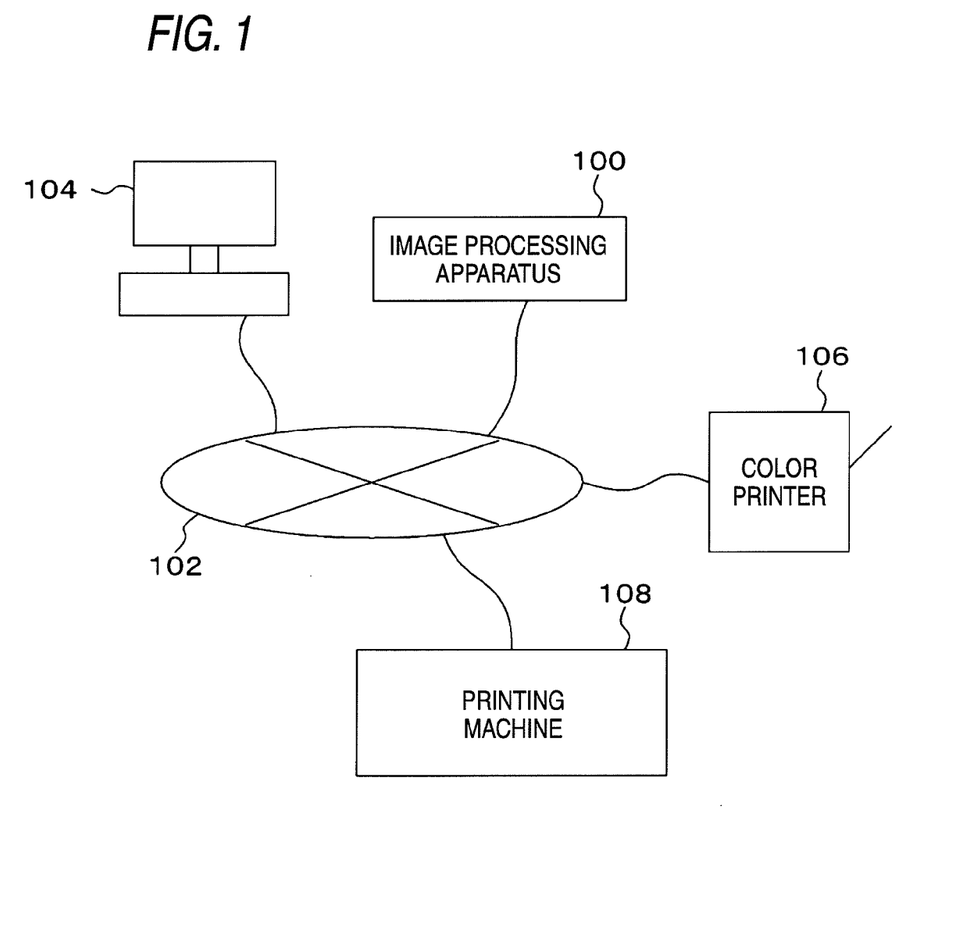
FIG. 1 is a diagram showing an application example of an image processing apparatus according to an exemplary embodiment.

FIG. 1 shows an application example of an image processing apparatus according to an exemplary embodiment. In FIG. 1, an image processing apparatus 100 is connected via a communication tool 102 such as a network to an image generation device 104 implemented by an appropriate computer and a color printer 106 which draws a proofreading output image (sample for confirmation), for example. Also, a printing machine 108 may be connected to the communication tool 102 to print out image information generated by the image generation device 104.

If acquired image information includes designation regarding drawing of a special color (spot color) such as a color (e.g., a metallic color) which is difficult to be represented by process colors or a color which is reproduced by a designated ink, the image processing apparatus 100 represents the spot color by a combination of process colors (e.g., cyan (C), magenta (M), yellow (Y), black (K)), and gives the color printer 106 an instruction of drawing a drawing area (spot color area) of the spot color and a drawing area (non-spot color area) with the process colors other than the spot color, so as to draw a proofreading output image for allowing the prior confirmation of an image including the spot color.

The printing machine 108 divides the image information into plates corresponding to the process colors (e.g., C, M, Y, and K) and forms an image according to a size and arrangement of dots formed by the ink of each process color. Also, some of the printing machines 108 can print using a special plate (spot color plate) in printing the spot color. On the other hand, the color printer 106 can not use the spot color. Therefore, if a spot color is designated in the image information, the color printer 106 draws the image information with a combination of the process colors of C, M, Y and K according to the drawing instruction output from the image processing apparatus 100. Also, the image information is output to the color printer as a composite output which is not separated into plates.

The image processing apparatus 100 is, for example, one (such as a printer server) for outputting the image information to an image forming device such as the color printer 106 or the printing machine 108. The image processing apparatus 100 is not limited thereto, but may be installed in the color printer 106 serving as the image forming device, for example. Further, the image processing apparatus 100 may be an RIP server or PDL conversion server, or may be installed as an image viewer software running on the image generation device 104 (personal computer, etc.) which serves as a client.

Figure 2:
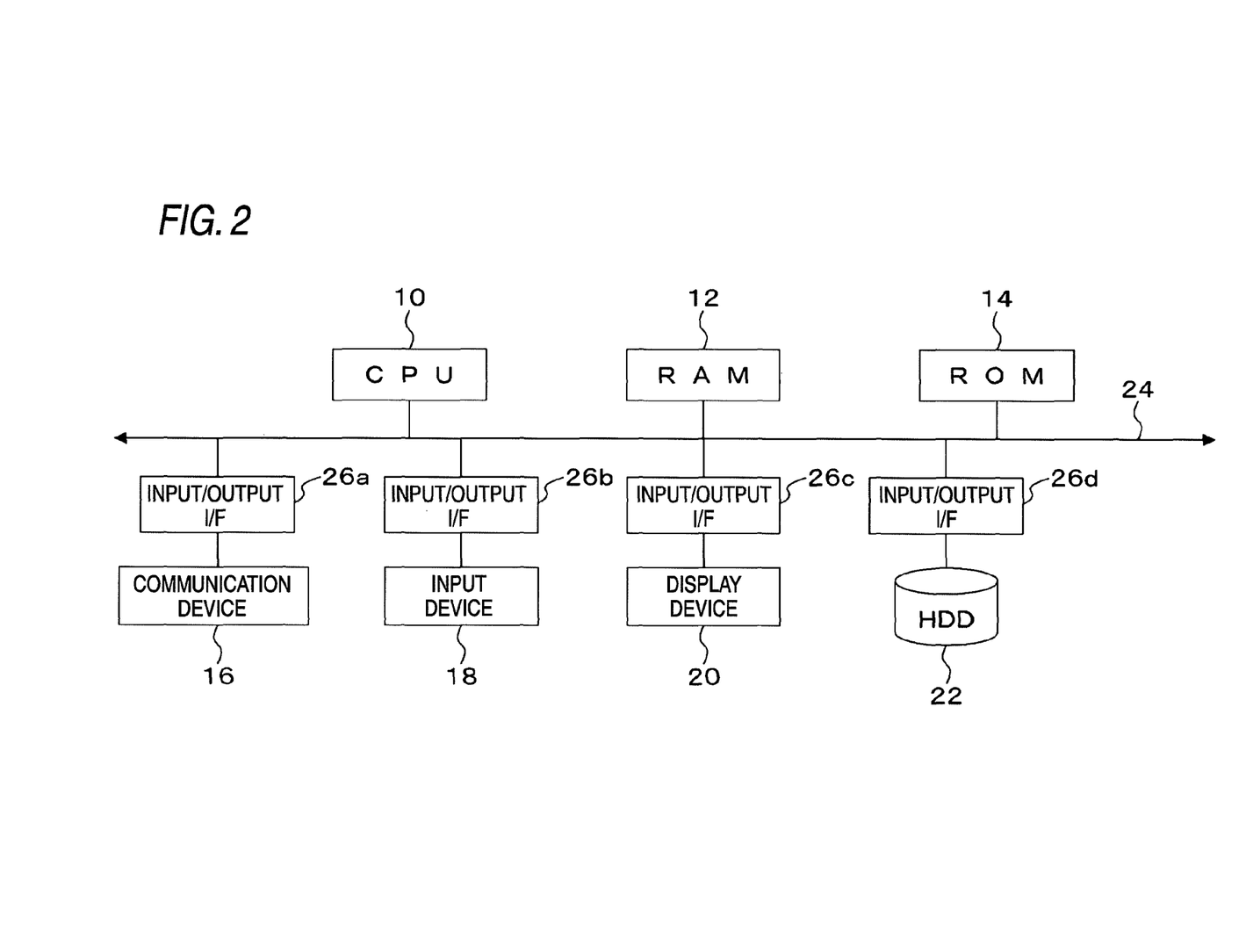
FIG. 2 is a diagram showing an example of the hardware configuration of a computer constituting the image processing apparatus according to the exemplary embodiment.

FIG. 2 shows an example of the hardware configuration of a computer constituting the image processing apparatus 100 according to the exemplary embodiment. In FIG. 2, the image processing apparatus 100 includes a central processing unit (e.g., CPU such as a microprocessor) 10, a random access memory (RAM) 12, a read-only memory (ROM) 14, a communication device 16, an input device 18, a display device 20 and a hard disk drive (HDD) 22. Also, these elements are interconnected via a bus 24. The communication device 16, the input device 18, the display device 20 and the hard disk drive 22 are connected to the bus 24 via input/output interfaces 26a, 26b, 26c and 26d, respectively.

The CPU 10 controls an operation of respective sections (which will be described later) based on a control program stored in the RAM 12 or ROM 14. The RAM 12 mainly functions as a working area for the CPU 10, and the ROM 14 stores a control program such as BIOS and other data which is used by the CPU 10.

Also, the communication device 16 includes a USB (universal serial bus) port, a network port and another appropriate interface, and is used by the CPU 10 to exchange data with an external device via the communication tool such as a network. For example, the communication device 16 communicates with the color printer 106 to draw the proofreading output image (sample for confirmation).

Also, the input device 18 includes a keyboard, a pointing device and a touch panel, and is used by a user to input an operation instruction.

Also, the display device 20 includes a liquid crystal display and a touch panel, and displays a processing result (for example, the proofreading output image) by the CPU 10.

Also, the hard disk drive 22 is a storage device which stores various types of data required in later processing. Instead of the hard disk drive 22, a non-volatile storage device such as EEPROM may be used.

Figure 3:
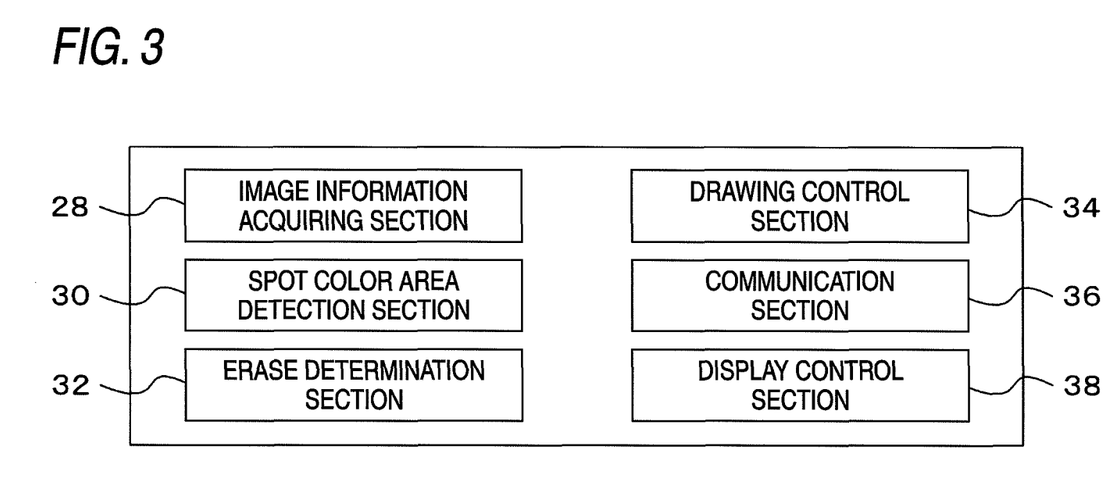
FIG. 3 is a functional block diagram of the image processing apparatus according to the exemplary embodiment.

FIG. 3 is a functional block diagram of the image processing apparatus 100 according to the exemplary embodiment. In FIG. 3, the image processing apparatus 100 includes an image information acquiring section 28, a spot color area detection section 30, an erase determination section 32, a drawing control section 34, a communication section 36 and a display control section 38. These functions are implemented by the CPU 10 and a program for controlling the processing operation of the CPU 10, for example.

The image information acquiring section 28 acquires the image information (including a drawing instruction sequence for drawing an image) generated by the image generation device 104 such as an appropriate computer. This image information may be acquired from the image generation device 104 via the communication device 16. Alternatively, the image information generated in the computer on which the image processing apparatus 100 according to this embodiment runs may be acquired via the bus 24.

The spot color area detection section 30 detects a spot color area in the image information acquired by the image information acquiring section 28. The "spot color area" means an area designated by the drawing instruction sequence as an area to be drawn with the spot color in an image which is drawn based on the image information. The printing machine 108 prints the spot color area as a spot color plate with the spot color. Also, when the color printer 106 is to draw the proofreading output image, the spot color area is represented with a combination of the process colors of C, M, Y and K. The spot color area detection section 30 detects the spot color area by interpreting the drawing instruction sequence. Also, the spot color area detection section 30 determines as to whether the spot color area is drawn only with the spot color or drawn with a mixture of the spot color and the process colors of C, M, Y and K, by interpreting the drawing instruction sequence.

The erase determination section 32 determines, based on the designation, in the image information, regarding drawing of the spot color area, as to whether or not a non-spot color area overlapping the spot color area is to be erased. The "non-spot color area" means an area which is designated by the drawing instruction sequence as an area to be drawn with the process colors (e.g., C, M, Y, K) other than the spot color (i.e., to be drawn with non-spot colors) in the image, which is drawn based on the image information. The printing machine 108 prints the non-spot color area as plates of the respective process colors. Whether or not a color of the non-spot color area in an area where the non-spot color area overlaps the spot color area is to be erased is described in advance in the drawing instruction sequence included in the image information as designation regarding drawing of the spot color area. The designation regarding the drawing includes either designation for preserving the non-spot color area or designation for erasing the non-spot color area.

When the color printer 106 is to draw the proofreading output image, the drawing control section 34 outputs an instruction of erasing the spot color area and determines a drawing range of the non-spot color area based on the determination result of the erase determination section 32. In the case of "designation for preserving the non-spot color area", the non-spot color area overlapping the spot color area is not erased, and the drawing range of the non-spot color area is both the range where the non-spot color area overlaps the spot color area and the range where the non-spot color area does not overlap the spot color area. On the other hand, in the case of "designation of erasing the non-spot color area", the non-spot color area overlapping the spot color area is erased, and the drawing range of the non-spot color area is only the range where the non-spot color area does not overlapping the spot color area. In any case, the spot color area is erased from the proofreading output image.

The communication section 36 controls communication of the image information, an erase instruction of the spot color area, the drawing range of the non-spot color area and the other information with the color printer 106 for drawing the proofreading output image via the communication device 16.

The display control section 38 displays the proofreading output image on the display device 20 under the control of the drawing control section 34.

Figure 4:
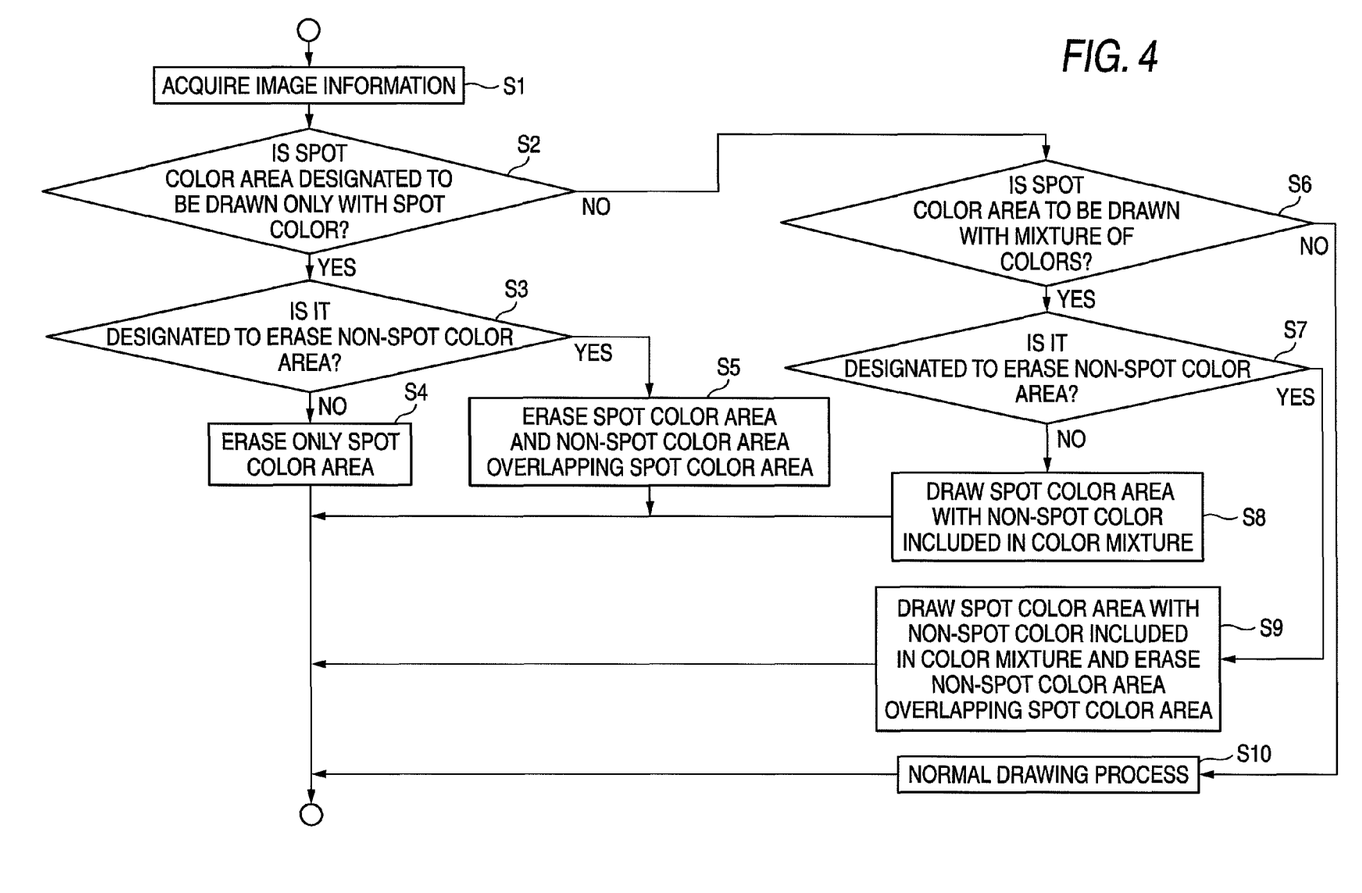
FIG. 4 is a flowchart showing an operation example of the image processing apparatus according to the exemplary embodiment.
Figure 5A:
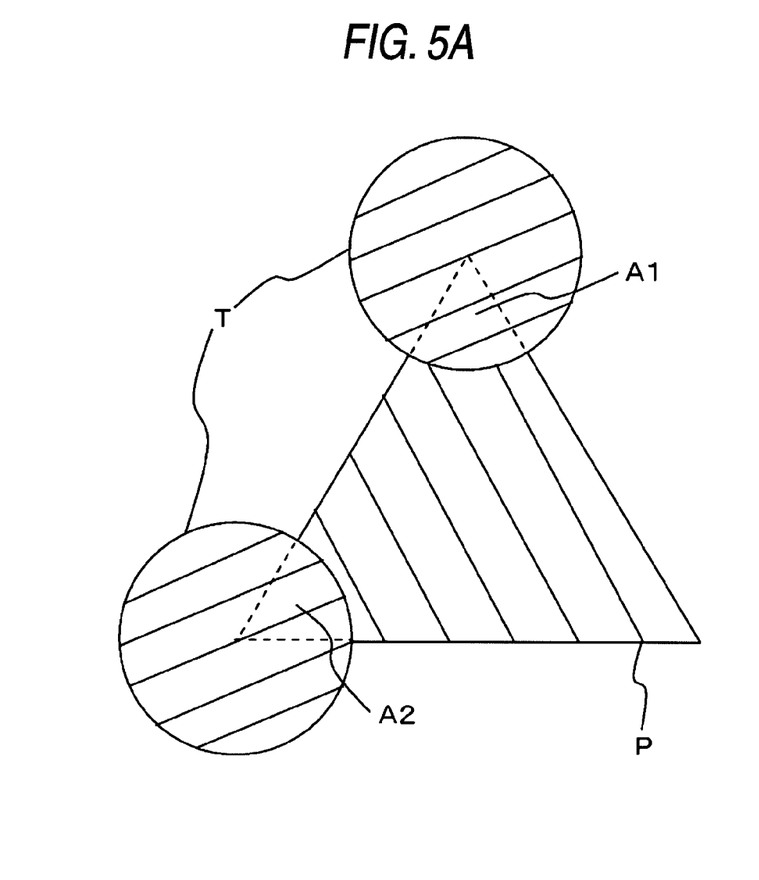
FIGS. 5A and 5B are views showing an example of a drawing result of a proofreading output image by a color printer.
Figure 5B:
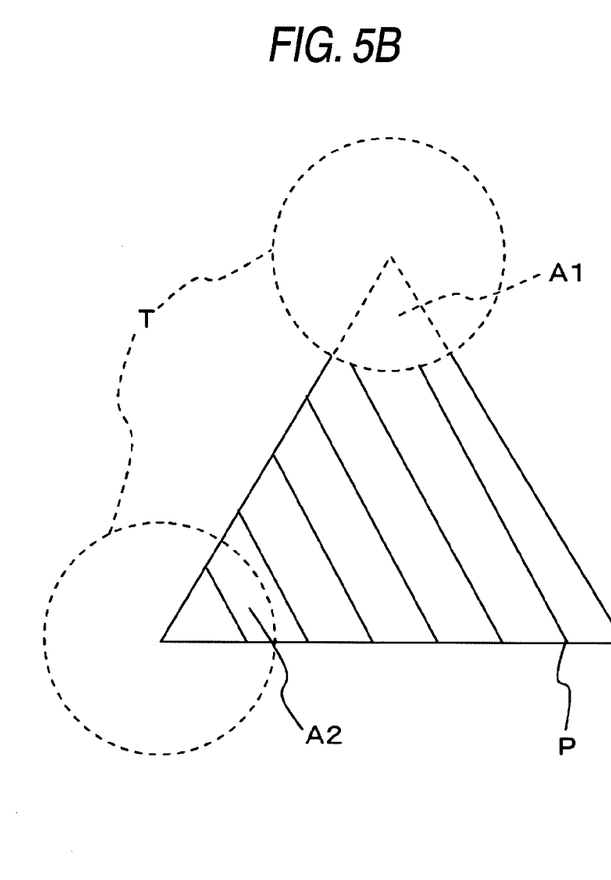
Figure 6A:
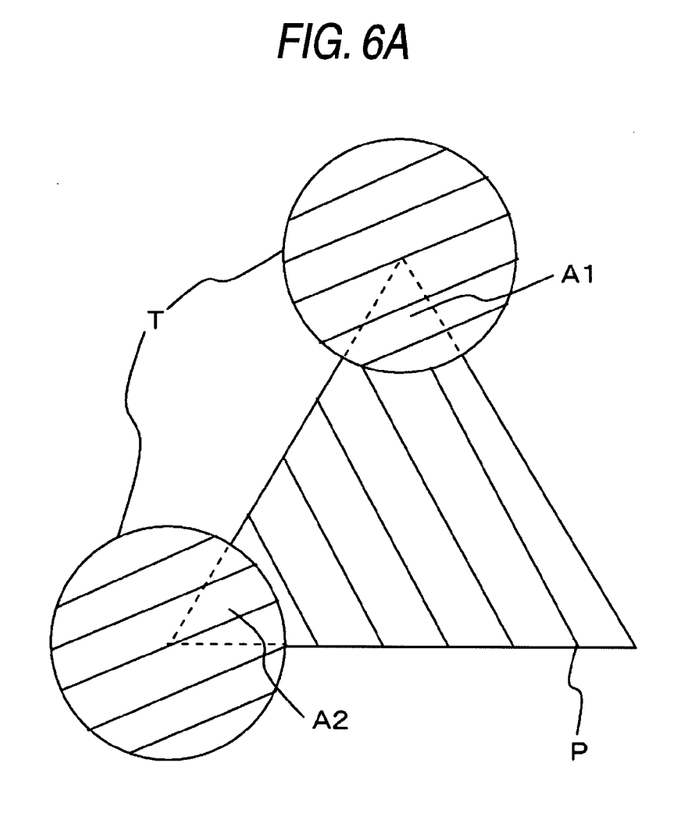
FIGS. 6A and 6B are views showing another example of the drawing result of the proofreading output image by the color printer.
Figure 6B:
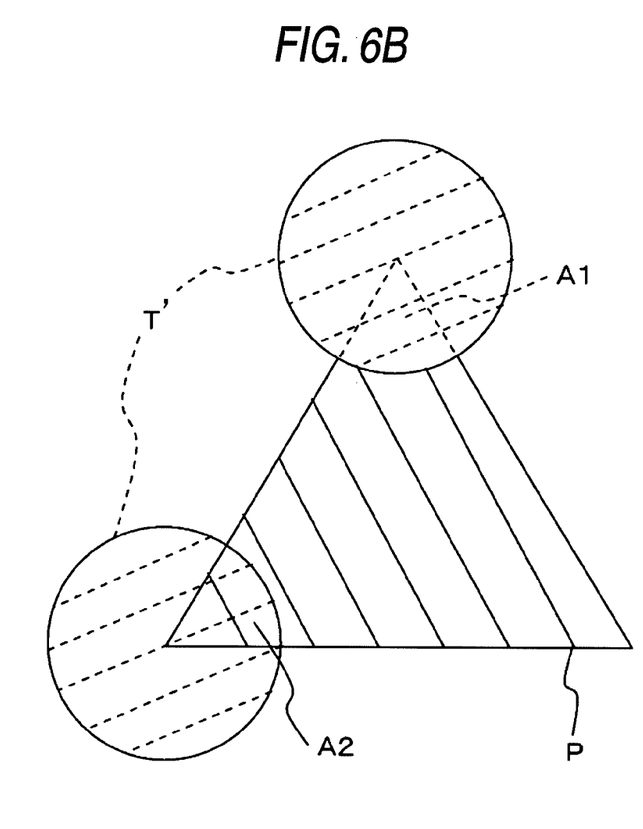

FIG. 4 shows a flow of an operation example of the image processing apparatus 100 according to the exemplary embodiment. FIGS. 5A and 5B show an example of drawing results of the proofreading output image by the color printer 106. Also, FIGS. 6A and 6B show another example of the drawing results of the proofreading output image by the color printer 106.

FIG. 4 shows the operation example in drawing the proofreading output image based on the image information by the color printer 106. In FIG. 4, if the image information acquiring section 28 acquires the image information (S1), the spot color area detection section 30 detects the spot color area, and determines as to whether it is designated to draw the spot color area only with the spot color or to draw with a mixture of the spot color and the process colors (S2).

If the spot color area detection section 30 determines at S2 that it is designated to draw the spot color area only with the spot color, the erase determination section 32 determines as to whether or not the non-spot color area overlapping the spot color area is to be erased, based on the designation, in the image information, regarding drawing of the spot color area (S3).

In an example of FIG. 5A, two circular regions are spot color areas T, and a triangular region is a non-spot color area P to be drawn with the process color(s). In this example, there are two overlap portions A1 and A2 in which the spot color areas T and the non-spot color area P overlap. Also, the overlap portions A1 and A2 in the triangular region representing the non-spot color area P are represented by dotted lines which indicate that the spot color area T is overwritten. The erase determination section 32 determines as to whether or not the non-spot color area P in the overlap portions A1 and A2 is to be erased (whether or not the non-spot color area P is to be drawn) for each of the overlap portions A1 and A2 by interpreting the drawing instruction sequence included in the image information.

If the erase determination section 32 determines at S3 that it is designated not to erase but to preserve the non-spot color area, the drawing control section 34 outputs an instruction of only erasing the spot color area (S4). In this case, the non-spot color area (both the range where the non-spot color area overlaps the spot color area and the range where the non-spot color area does not overlap the spot color area) is drawn. On the other hand, if the erase determination section 32 determines at S3 that it is designated to erase the non-spot color area, the drawing control section 34 outputs an instruction of erasing the spot color area, and determines the remaining non-spot color area obtained by erasing a part where the non-spot color area overlaps the spot color area, as a drawing range of the non-spot color area (S5). In this case, the non-spot color area in the range where the non-spot color area does not overlap the spot color area is drawn.

In the example of FIG. 5A, of the overlap portions A1 and A2 between the spot color areas T to be drawn with the appropriate spot color(s) and the non-spot color area P to be drawn with the appropriate process colors, the overlap portion A1 has the "designation of erasing the non-spot color area" and the overlap portion A2 has the "designation of preserving the non-spot color area". As a result, the drawing control section 34 erases the spot color area T and sets an area in which the overlap portion A2 is preserved while the overlap portion A1 is erased as a drawing range of the non-spot color area P, as shown in FIG. 5B. In FIG. 5B, the erased area is indicated by the dashed lines, and the preserved area (drawn by the color printer 106) is indicated by the solid lines.

Herein, as an example of a method in which the drawing control section 34 designates the drawing ranges of the spot color area T and the non-spot color area P, drawing of the spot color area T is instructed with respective setting values of the process colors (C, M, Y, K) being set to 0 (designation of white), to thereby erase the overlap portion A1 where the non-spot color area P overlaps the spot color area T. This is because the non-spot color area P is overwritten by drawing the spot color area T with the spot color area T being replaced by the process colors. Also, by outputting no drawing instruction for the spot color area T, only the spot color area T can be erased, and the non-spot color area P overlapping the spot color area T can be preserved.

Next, if it is not designated to draw the spot color area only with the spot color at S2, it is determined as to whether or not it is designated to draw the spot color area with a mixture of the spot color and the process color (S6).

If it is designated to draw that the spot color area with the mixture of the spot color and the process color(s) at S6, the erase determination section 32 determines as to whether or not the non-spot color area overlapping the spot color area is to be erased, based on the designation, in the image information, regarding the drawing of the spot color area (S7).

In the example of FIG. 6A, two circular areas are the spot color areas T to be drawn with the color mixture, and the triangular region is the non-spot color area P to be drawn with the process color(s). In this example, there are two overlap portions A1 and A2 in each of which the spot color area T and the non-spot color area P overlap each other. Also, the overlap portions A1 and A2 in the triangular region representing the non-spot color area P are represented by the dotted lines, which indicate that the spot color area T is overwritten. The erase determination section 32 determines for each of the overlap portions A1 and A2 as to whether or not the non-spot color area P in the overlap portion is to be erased (or whether or not the non-spot color area P in the overlapping portion is to be drawn), by interpreting the drawing instruction sequence included in the image information.

If the erase determination section 32 determines at S7 that it is designated not to erase but preserve the non-spot color area, the drawing control section 34 outputs an instruction of drawing the non-spot color area and an instruction of drawing the spot color area with the non-spot color included in the color mixture (S8). In this case, the non-spot color area (both the range where the non-spot color area overlaps the spot color area and the range where the non-spot color area does not overlap the spot-color area) is drawn, and the spot color area is drawn with the non-spot color included in the color mixture. On the other hand, if the erase determination section 32 determines at S7 that it is designated to erase the non-spot color area, the drawing control section 34 outputs an instruction of drawing the spot color area with the non-spot color included in the color mixture, and determines the remaining non-spot color area obtained by erasing a part where the non-spot color area overlaps the spot color area, as a drawing range of the non-spot color area (S9). In this case, the non-spot color area in the range where the non-spot color area does not overlap the spot color area is drawn, and the spot color area is drawn with the non-spot color included in the color mixture.

In the example of FIG. 6A, of the overlap portions A1 and A2 between the spot color areas T to be drawn with the appropriate spot color and the non-spot color area P to be drawn with the appropriate process color, the overlap portion A1 has the "designation of erasing the non-spot color area", and the overlap portion A2 has the "designation of preserving the non-spot color area". As a result, the drawing control section 34 issues an instruction of drawing the spot color area T' which is to be drawn in the non-spot color included in the color mixture and set an area which is obtained by preserving the overlapping portion A2 while erasing the overlap portion A1 as a drawing range for the non-spot color area P, as shown in FIG. 6B. As a result, the overlap portion A1 is drawn only with the non-spot color included in the color mixture, and the overlap portion A2 is drawn by overlaying the non-spot color included in the color mixture and the color of the non-spot color area P. In FIG. 6B, the overlap portion A1 is indicated by the dashed lines and represented as the erased area.

As an example of the method in which the drawing control section 34 designates the drawing ranges of the spot color area T and the non-spot color area P, settings of the spot color and settings of the non-spot color are made separately in the drawing with the color mixture, in which a set value of the non-spot color is not changed, and each set value of the process colors (C, M, Y, K) is set at 0 for the spot color, and drawing of the spot color area T' is instructed. For example, if the color mixture is designated such as [/DeviceN (non-spot color) (spot color)], the set value of the (non-spot color) portion is not changed, and the set value of the (spot color) portion is set to 0. Thereby, the spot color area T' is drawn with the non-spot color included in the color mixture, and since the set value of the spot color is 0, the non-spot color area P in the overlap portion A1 where the non-spot color area P overlaps the spot color area T' can be erased. By this replacement, only the spot color portion can be erased without the value of the non-spot color portion being changed.

Also, the set value of the non-spot color is not changed, and the drawing instruction for the spot color is not issued. Thereby, the spot color area T' to be drawn with the non-spot color included in the color mixture and the non-spot color area P overlapping the spot color area T' can be preserved. A process for issuing no drawing instruction for the spot color may be implemented, for example, by outputting the setting of the (spot color) in the [/DeviceN (non-spot color) (spot color)] to a dummy plate so that the setting is not used in the actual drawing by the color printer 106.

If it is not designated to draw the spot color area with a mixture of the spot color and the process colors at S6, the drawing control section 34 instructs a normal drawing process with the process colors, because the spot color area is not included in the image information (S10).

The drawing instruction output by the drawing control section 34 at the above steps are sent via the communication section 36 and the communication tool 102 to the color printer 106 to draw the proofreading output image. Before or at the same time as drawing of the proofreading output image, the display control section 38 may display the proofreading output image on the display device 20.

A program for executing each step of FIG. 4 may be stored in the recording medium, or the program may be provided through the communication tool (for example, a network). In this case, the invention may be implemented in the form of a "computer-readable medium storing the program" or a "data signal".

In the exemplary embodiment as described above, when the drawing control section 34 outputs an instruction of erasing the spot color area, a user cannot confirm the spot color area in the proofreading output image. Thus, if there is an instruction of erasing the spot color area, the drawing control section 34 may output an instruction of drawing the spot color area T with a predetermined process color to generate a proofreading output image which is different from that generated through the process up to S9 in FIG. 4. Thereby, the proofreading output image in which the spot color area T is erased and the proofreading output image in which only the spot color area T is drawn may be formed on separate print sheets or other media.

Further, in the case where the printing machine 108 for printing the image information can print plates the number of which exceeds the number of process colors of C, M, Y and K, spot color(s) the number of which is equal to or less than a difference between the number of print plates and the process colors may be used. Therefore, the drawing control section 34 may determine in advance the available number of spot colors, and may not output an instruction of erasing the spot color if the number of spot colors included in the image information is within the predetermined number. In this case, it is instructed to draw the spot color, which is not erased, with a combination of appropriate process colors. Also, a type of the spot color which is not erased may be preset. If the number of spot colors exceeds the predetermined number, output is an instruction of erasing a part of the spot colors so that the number of resultant spot colors is equal to the predetermined number.

What is claimed is:

1. An image processing apparatus comprising:
a spot color area detection unit that detects a spot color area in image information;
an erasing determination unit that determines whether or not a non-spot color in a non-spot color area overlapping with the spot color area in an overlap area is to be erased based on designation regarding a drawing of the spot color area; and
a drawing control unit that outputs instructions for (i) erasing a spot color in the spot color area which includes both the overlap area and a non-overlap area where the spot color area does not overlap with the non-spot color area, and (ii) drawing the non-spot color area based on the determination of the erasing determination unit.

2. The image processing apparatus according to claim 1, wherein if a spot color and a non-spot color are mixed in the spot color area, the drawing control unit does not erase the non-spot color in the spot color area.

3. The image processing apparatus according to claim 1, wherein the drawing control unit assigns a predetermined non-spot color to the spot color area to be erased.

4. The image processing apparatus according to claim 1, wherein if the number of spot colors included in the image information is equal to or less than predetermined number, the drawing control unit does not erase the non-spot color area.

5. The image processing apparatus according to claim 1, wherein the drawing control unit does not erase the non-spot color area including a predetermined spot color.

6. The image processing apparatus according to claim 1, wherein the designation regarding the drawing of the spot color area includes an instruction whether or not to erase the non-spot color in the overlap area.

7. The image processing apparatus according to claim 1, wherein the drawing control unit further outputs an instructions of drawing the erased spot color in the spot color area using a predetermined process color on a separate output image that is different from an output image where the non-spot color area is drawn.

8. An image processing method comprising:
detecting a spot color area in image information;
determining whether or not a non-spot color in a non-spot color area overlapping with the spot color area in an overlap area is to be erased based on designation regarding a drawing of the spot color area;
outputting an instruction of erasing the spot color area; and
determining a drawing of the non-spot color area based on the determination result as to whether or not the non-spot color in the non-spot color area overlapping with the spot color area in the overlap area is to be erased.

9. The image processing method according to claim 8, wherein if a spot color and a non-spot color are mixed in the spot color area, the non-spot color in the spot color area is not erased.

10. The image processing method according to claim 8, further comprising
assigning a predetermined non-spot color to the spot color area to be erased.

11. The image processing method according to claim 8, wherein if the number of spot colors included in the image information is equal to or less than predetermined number, the non-spot color area is not erased.

12. The image processing method according to claim 8, wherein the non-spot color area including a predetermined spot color is not erased.

13. The image processing method according to claim 8, wherein the designation regarding the drawing of the spot color area includes an instruction whether or not to erase the non-spot color in the overlap area.

14. A non-transitory computer-readable medium storing a program that causes a computer to execute image processing, the image processing comprising:
detecting a spot color area in image information;
determining whether or not a non-spot color in a non-spot color area overlapping with the spot color area in an overlap area is to be erased based on designation regarding a drawing of the spot color area;
outputting an instruction of erasing the spot color area; and
determining a drawing of the non-spot color area based on the determination result as to whether or not the non-spot color in the non-spot color area overlapping with the spot color area in the overlap area is to be erased.

15. The computer-readable medium according to claim 14, wherein if a spot color and a non-spot color are mixed in the spot color area, the non-spot color in the spot color area is not erased.

16. The computer-readable medium according to claim 14, wherein the image processing further comprises
   assigning a predetermined non-spot color to the spot color area to be erased.

17. The computer-readable medium according to claim 14, wherein if the number of spot colors included in the image information is equal to or less than predetermined number, the non-spot color area is not erased.

18. The computer-readable medium according to claim 14, wherein the non-spot color area including a predetermined spot color is not erased.

19. The image processing apparatus according to claim 1, wherein when a number of spot colors included in the information is more than a number of available spot colors of a printing apparatus, the drawing control unit outputs the instruction of erasing the spot color in the spot color area so that a number of spot colors left is equal to the number of available spot colors of the printing apparatus.

20. The image processing apparatus according to claim 19, wherein when a number of spot colors included in the information is equal to less than the number of available spot colors of the printing apparatus, the drawing control unit does not output the instruction of erasing the spot color in the spot color area.

* * * * *